(12) United States Patent
Ouchi

(10) Patent No.: US 7,778,465 B2
(45) Date of Patent: Aug. 17, 2010

(54) IMAGE FORMING APPARATUS WITH A PLURALITY OF FUNCTIONS

(75) Inventor: Takaharu Ouchi, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 855 days.

(21) Appl. No.: 11/674,828

(22) Filed: Feb. 14, 2007

(65) Prior Publication Data

US 2008/0192278 A1    Aug. 14, 2008

(51) Int. Cl.
*G06K 9/46* (2006.01)
*G06F 7/04* (2006.01)
*G03G 15/00* (2006.01)

(52) U.S. Cl. .................... 382/190; 399/80; 726/3; 726/27; 358/1.14; 358/1.15

(58) Field of Classification Search ............. 382/190; 399/80; 358/1.14, 1.15; 726/3, 27
See application file for complete search history.

(56) References Cited

U.S. PATENT DOCUMENTS

| | | | | |
|---|---|---|---|---|
| 7,564,464 B2 * | 7/2009 | Abe et al. | ................. | 345/581 |
| 7,613,932 B2 * | 11/2009 | Nance et al. | ................. | 713/191 |
| 7,653,183 B2 * | 1/2010 | Patel et al. | ................. | 379/88.18 |

FOREIGN PATENT DOCUMENTS

| JP | 2004-330708 | 11/2004 |
|---|---|---|
| JP | 2006-008869 | 1/2006 |

* cited by examiner

*Primary Examiner*—John B Strege
(74) *Attorney, Agent, or Firm*—Turocy & Watson, LLP

(57) ABSTRACT

An image forming apparatus with a plurality of functions includes an image information member at a position in a scan area of a scanner and outside an original document placement area. Image information which can be read by the scanner and specifies a permitted function or a prohibited function in the plurality of functions is formed in the image information member. Besides, a processing unit is provided which reads the information to specify the permitted function or the prohibited function from the image information read by the scanner and performs a permission or prohibition processing on the function.

20 Claims, 4 Drawing Sheets

1234567890ABCDEF → dsKnk89Ljlsd

|←——— MACHINE NUMBER ———→|⋈|←——————————→| ENCRYPTION DATA

FUNCTION PERMISSION OR
PROHIBITION INFORMATION

IMAGE FORMING APPARATUS WITH A PLURALITY OF FUNCTIONS

BACKGROUND OF THE INVENTION

1. Field of the Invention

The present invention relates to an image forming apparatus with a plurality of functions such as a scan function and a print function.

2. Description of the Related Art

In recent years, a complex image forming apparatus with a plurality of functions, such as a copy function, a scan function and a network print function, has come into use. In such a complex image forming apparatus (hereinafter referred to as an MFP), at the time of shipping from a maker, a plurality of functions (scan function, printer function, etc.) are previously installed. However, the user can not immediately use all these installed functions, and as described in JP-A-2006-88698, a device called an enabler is purchased from the maker, and only the function permitted by this device is made usable. That is, in the MFP, unless the enabler is not installed, all functions can not be used, and in the case where a specific function, for example, a printer function is desired to be used, the enabler to permit the printer function is purchased, and this is installed in the MFP, so that the printer function can be used.

Besides, in the case where the MFP is shared by a plurality of departments, there is a case where in a department, although the copy function can be used, the other functions such as the scan function and the network print function are desired not to be used in view of security and cost. In such a case, each department is made to have an enabler, and only the function specified by this enabler is permitted to be used.

As this enabler, a USB memory has been generally used. However, as described above, the enabler itself has only to store data to specify a function whose use is permitted or a function whose use is prohibited among the functions of the MFP. Accordingly, when the USB memory is used as the enabler, the cost becomes high relatively to the role to be played.

Besides, in general, in MFPs as network equipments, an identification number called a MAC address is assigned to each of the MFPs. This MAC address is stored in a dedicated ROM, and this also causes the cost to increase.

DETAILED DESCRIPTION OF THE INVENTION

In an embodiments of the invention, as an information member to give an instruction to an MFP, an image signal readable by a scanner is used, so that the structure can be inexpensively achieved without requiring an expensive USB memory or ROM, and the function of the MFP can be effectively used at low cost. Hereinafter, embodiments of the invention will be described in detail with reference to the accompanying drawings as examples.

Figure 1:
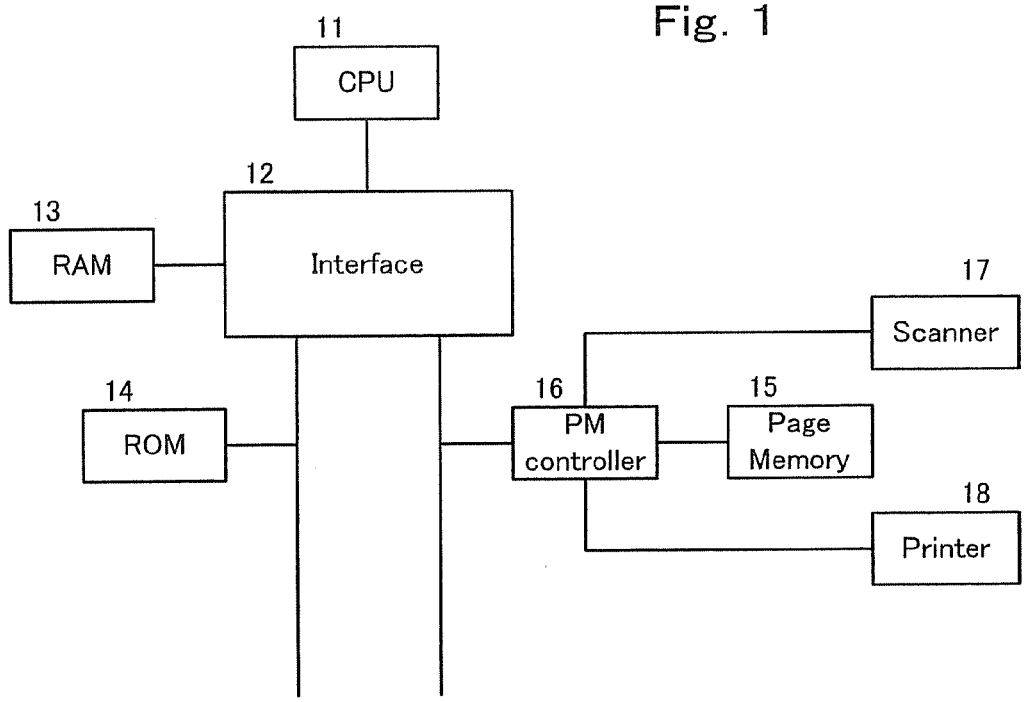
FIG. 1 is a block diagram showing a system structure of an image forming apparatus with a plurality of functions according to a first embodiment of the invention.

In this embodiment, a case where an enabler is inexpensively realized by an information member will be described. FIG. 1 is a system block diagram of a multifunction image forming apparatus (MFP) with a scanner function, a printer function and the like. In FIG. 1, numeral 11 denotes a CPU which controls various devices. An after-described processing unit as a feature portion of the invention is structured in software by the CPU 11. Numeral 12 denotes an interface which connects the CPU 11 to various devices described later. Numeral 13 denotes a RAM which is used for temporal storage of data in an operation during program execution, or the like. Numeral 14 denotes a ROM in which fixed data such as a control program is stored. Numeral 15 denotes a page memory in which image data or the like transferred from a scanner 17 is temporarily stored. Numeral 16 denotes a page memory controller which transfers the image data transferred from the scanner 17 to the page memory 15 or transfers data of the page memory 15 to a printer 18.

Figure 2:
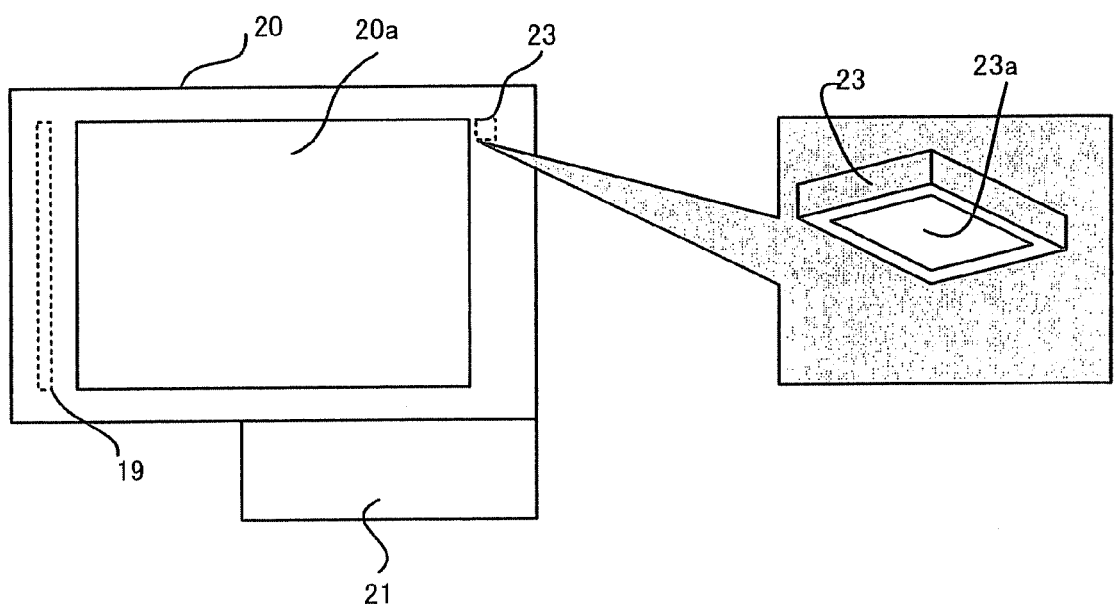
FIG. 2 is an explanatory plan view in which a part showing a scanner portion according to the first embodiment of the invention is enlarged.

FIG. 2 is an outer appearance view (view seen from above) of the scanner 17. The scanner 17 optically reads an original document placed on a specified position, and includes a carriage (positioned at a home position in the drawing) 19, an original stand glass 20, and a control panel 21. The carriage 19 is provided to be movable at the lower side (back surface side) of the original stand glass 20 in a state where its reading part is directed upward, and optically reads, by the movement in the illustrated lateral direction, an original document placed downward on an original document placement area 20a of the original stand glass 20.

Numeral 23 denotes an image information member which is provided in a scan area of the scanner 17 and at a position outside the original document placement area 20a. That is, this image information member 23 is disposed at the position on the original stand glass 20 where the carriage 19 is moved and it can be read by the carriage 19. Besides, this image information member 23 is like a rectangular plate, and an image information 23a is formed on the illustrated lower surface opposite to the reading part of the carriage 19.

Here, in this embodiment, since the image information member 23 is used as the enabler, information for specifying a permitted function whose use is permitted or a prohibited function whose use is prohibited among a plurality of functions installed in the MFP is formed as the image information 23a. As a specific example of the image information 23a, for example, like a two-dimensional bar code, an image in which binary data is embedded is used. As described above, the image information member 23 is disposed at the portion outside the original document placement area 20a of the original stand glass 20 while the image surface is directed downward (that is, to the carriage 19 side), and can be scanned by the carriage 19. Incidentally, the image information member 23 is disposed outside the original document placement area 20a in order to prevent an original document from overlapping with the image information at the time of a normal scan operation.

In the MFP, in the processing unit realized by the CPU 11 in FIG. 1, the information to specify the permitted function or the prohibited function is read from the image information read by the carriage 19 of the scanner 17, and a permitting or prohibiting processing is performed on the function. As stated above, as the image information 23a of the image information member 23, the information relating to permission/prohibition of various functions installed in the MFP is embedded, so that the function of the enabler can be realized.

Here, since the image information 23a is easily copied by a copier or the like, even if the image information member 23 is not purchased properly, it is illegally copied and can be used. In order to prevent this, the information relating to permission/prohibition of the function and a number intrinsic to the applied MFP, for example, a machine number are combined and embedded in the image information. By this, the image information 23a becomes intrinsic to each of the machines of the MFPs, and even if it is copied and is used in another machine, it becomes meaningless.

In this case, the processing unit realized by the CPU 11 determines whether the machine number in the image information 23a read from the scanner 17 coincides with a number previously set to itself. In the case of coincidence, it is determined that this image information is legitimate, and a processing is performed in accordance with the information to specify the permitted function or prohibited function. Thus, it is possible to prevent the unauthorized use based on the copy of only the function information.

Incidentally, as described above, when the information relating to the permission or prohibition of a function and the machine number are merely simply combined, there is a possibility that the rule is decoded in the case where the data is read. In this case, the data of the enabler is illegally created by falsification of the data. Then, the information of the combination of the information relating to the permission or prohibition of the function and the machine number is previously encrypted to form the image information 23a, and it is formed in the image information member 23.

Figures 3, 5:
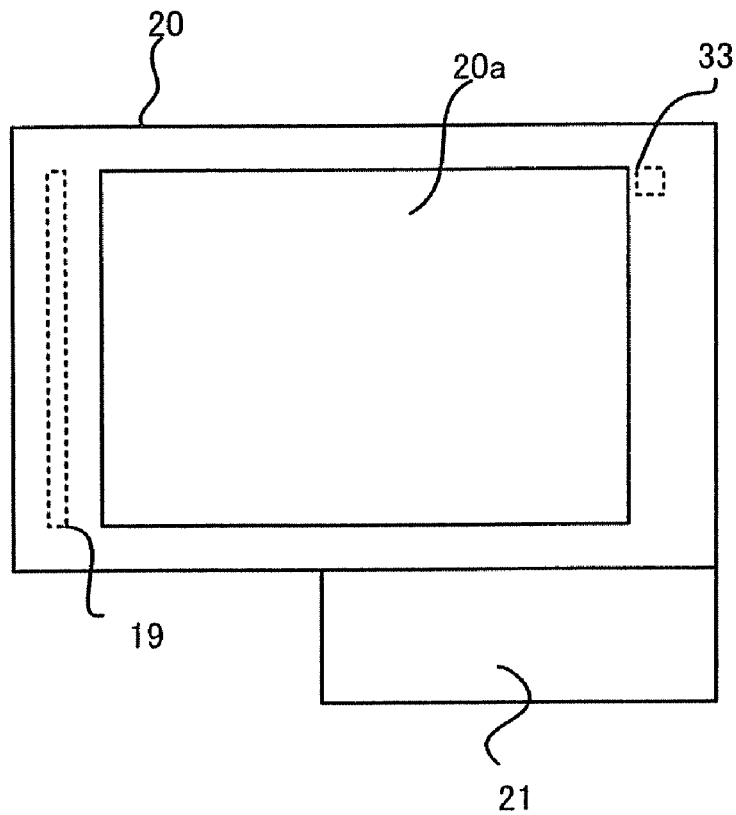
FIG. 3 is a view for explaining an encryption method in the first embodiment of the invention.
FIG. 5 is a plan view showing a scanner portion according to a second embodiment of the invention.

As stated above, when it is set such that the encrypted image information 23a is read and this is decrypted, the possibility that the data is decoded almost disappears. FIG. 3 shows an example of encryption in the case where the machine number is 1234567890 and the information relating to the permission or prohibition of the function is ABCDEF.

In this case, since the read image information is encrypted, the processing unit realized by the CPU 11 has naturally an encryption decoding function and performs a decoding processing.

Incidentally, since the image information member 23 used as the enabler is such that the function is sold as an object, it is necessary that the member itself has a structure to be easily detached as a single body from the MFP. Then, as shown in FIG. 2, what is obtained by bonding the image information 23a to the plate-like material (the image information 23a may be printed on the plate-like material body itself) is handled as the enabler. Besides, a small window (or recess) to which this material body 23 can be attached is prepared at the scanner side 17, and this material body 23 is attached to the scanner so as to be fitted in the small window (or the recess) and is used.

Figure 4:
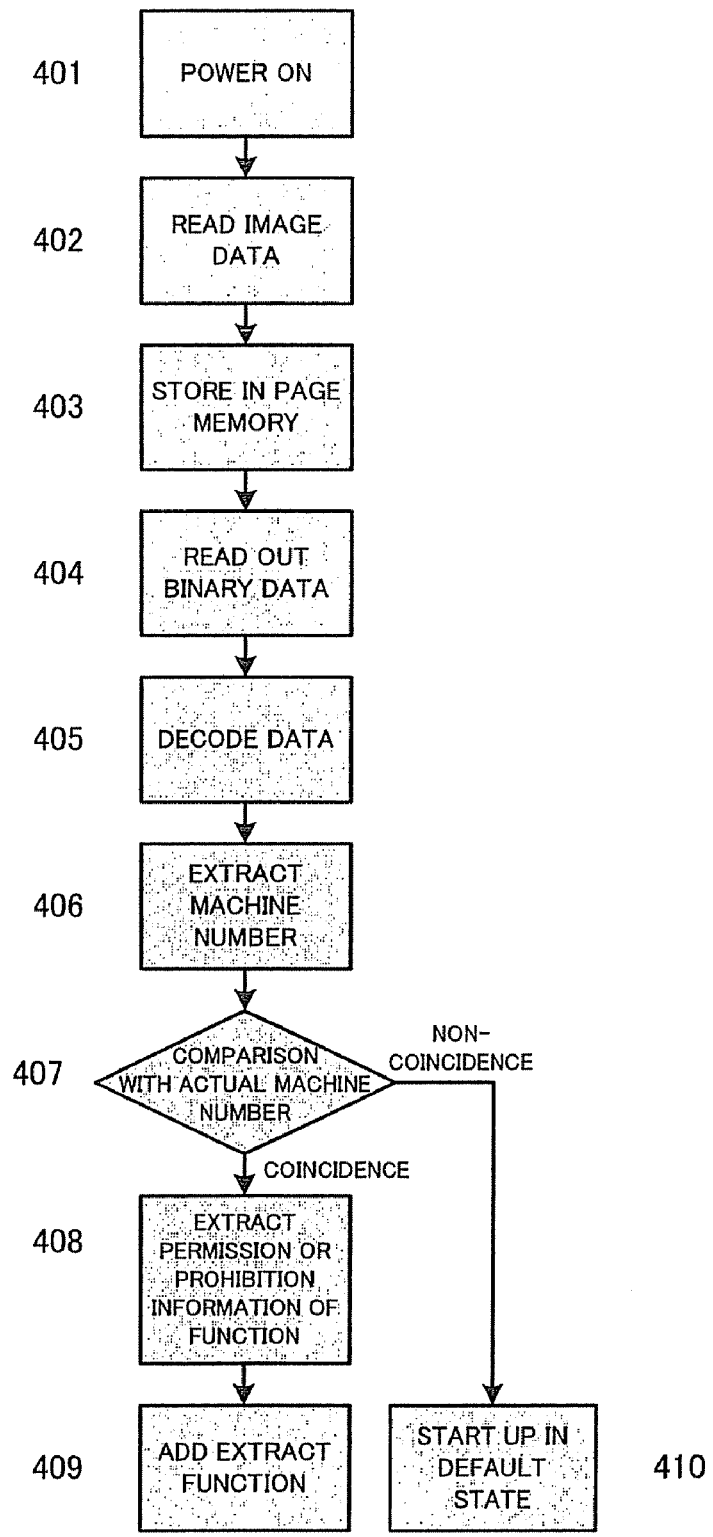
FIG. 4 is a flowchart for explaining the operation of the image forming apparatus with the plurality of functions according to the first embodiment of the invention.

FIG. 4 shows a control flowchart. In FIG. 4, after the MFP is powered on (step 401), various initializations are completed, and the scanner 17 becomes operable. At this time point, the image information 23a of the image information member 23 is read by the scanner (step 402).

Incidentally, a place where the image information member is disposed is previously specified, and only that place may be read.

The read image information passes through a path similar to that of normal copy data, and is stored as bit map data in the page memory 15 (step 403). The data of the page memory 15 is read into the CPU 11 through the page memory controller 16, and the embedded binary data is read out (step 404). The read out data is decoded (step 405), and is decomposed into the machine number and the permission or prohibition information of the function. Then, the machine number is extracted from these (step 406) and is compared with an actual machine number (previously set number) to make a check (step 407).

Incidentally, this actual machine number may be stored in any place, such as FROM, FRAM, or a specific register of ASIC.

As a result of the comparison, when the extracted machine number and the actual machine number coincide with each other, since the read image data is effective, the permission or prohibition information of the function is extracted (step 408), and the permission or prohibition processing of the function is performed according to the obtained information (step 409). In the case where the extracted machine number and the actual machine number do not coincide with each other, since the read image information 23a is ineffective, the machine is started up in the state (default state) where all optional functions are prohibited (step 410).

Next, a second embodiment of the invention will be described. In this second embodiment, instead of using a ROM, an image information member is used for setting of a MAC address. An MFP in this embodiment includes a network equipment for connection with an external network although it is not shown, and is structured such that data can be transferred to and from the outside through the network. As is well known, the MAC address is an identification number of an applied MFP on the network, and is set for each MFP. In this second embodiment, as stated above, the setting of the MAC address is performed by the image information member.

The system structure of the MFP in this second embodiment is basically the same as the system block diagram of the first embodiment shown in FIG. 1 although the network equipment is not shown, and its description will be omitted.

FIG. 5 is an outer appearance view (view seen from above) of the scanner of the MFP according to this second embodiment. Although it is almost the same as FIG. 2, a difference is that it is acceptable even if an image information member 33 can not be detached. That is, since the MAC address is not required to be changed once it is assigned, the image information member 33 is not required to be detached. Accordingly, the image information member 33 may be directly bonded to, for example, the back surface of a cover member to cover the scanner.

Incidentally, since the MAC address is the identification number of the network equipment as described above, there is no merit in copying, however, in case it is copied and the MAC addresses butt each other, a disadvantage occurs. Accordingly, in order to prevent such a disadvantage from occurring, similarly to the first embodiment, the image information is created in a data form in which for example, a machine number, which is intrinsic to the applied MFP, and a MAC address are combined. Of course, it is better to perform encryption.

In the above structure, the processing unit realized by the CPU 11 determines whether the machine number intrinsic to the MFP in the information read from the image information member 33 by the scanner 17 coincides with a previously set number. In the case of coincidence, since the MAC address in the image information is correct, this MAC address is used to initialize the network equipment.

Figure 6:
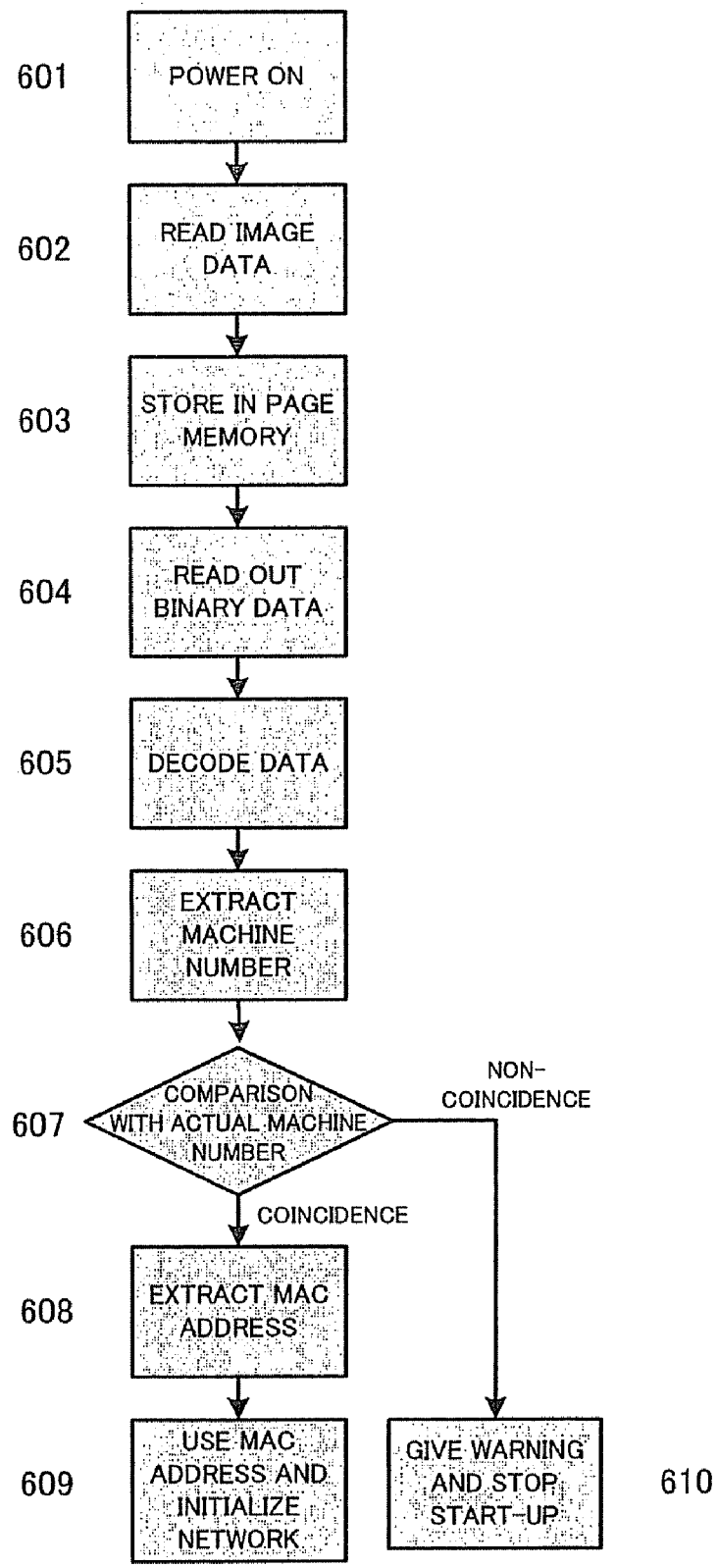
FIG. 6 is a flowchart for explaining the operation of an image forming apparatus with a plurality of functions according to the second embodiment of the invention.

FIG. 6 shows a control flowchart. In FIG. 6, after the MFP is powered on (step S601), various initializations are completed, and the scanner 17 becomes operable. At this time point, the image information of the image information member 33 is read by the scanner (step 602).

The read data is stored as bitmap data in the page memory 15 (step 603). The data of the page memory 15 is read into the CPU 11 through the page memory controller 16, and embedded binary data is read out (step 604). The read out data is decoded (step 605), and is decomposed into a machine number and a MAC address. The machine number is extracted from these (step 606), and is compared with an actual machine number (previously set number) to make a check (step 607).

Incidentally, it is the same that the actual machine number may be stored in any portion, such as FROM, FRAM, or a specific register of ASIC.

As a result of the comparison, when the extracted machine number and the actual machine number coincide with each other, since the read image information is effective, the MAC address is extracted from the image information (step 608). Then, the network equipment is initialized such that the extracted MAC address is used to perform setting in a register of a network controller (step 609). In the case where the extracted machine number and the actual machine number do not coincide with each other, since the image information is ineffective, a warning is given to the control panel 21, and the start-up is stopped (step 610).

As stated above, in this invention, the function, which has been realized by using a dedicated memory device in the related art, can be realized by combining the scanner generally included in the MFP and the image information member which can be formed very inexpensively. As a result, the cost of the memory device can be greatly reduced.

What is claimed is:

1. An image forming apparatus with a plurality of functions, comprising:
    a scanner to optically read an original document placed on a specified position;
    an image information member provided at a position in a scan area of the scanner and outside an original document placement area, which can be read by the scanner and in which image information for inputting specific information is formed; and
    a processing unit configured to determine whether the image information read by the scanner is proper, and extracts, when the image information is proper, the specific information from the image information.

2. The image forming apparatus with the plurality of functions according to claim 1, wherein
    the image information formed in the image information member includes the specific information and a number intrinsic to the applied image forming apparatus combinedly, and
    a determination criterion is set and the processing unit determines whether the number intrinsic to the image forming apparatus in the image information read by the scanner coincides with a previously set number, and determines, in a case of coincidence, that the image information is proper.

3. The image forming apparatus with the plurality of functions according to claim 1, wherein the image information formed in the image information member is a two-dimensional bar code representing the information in binary data.

4. The image forming apparatus with the plurality of functions according to claim 1, wherein the image information is encrypted, and the processing unit has an encryption decoding function.

5. The image forming apparatus with the plurality of functions according to claim 1, wherein the image information member is attached to a specified position in the scan area and in a replaceable state.

6. The image forming apparatus with the plurality of functions according to claim 1, wherein the image information member is a plate-like member on one side of which the image information is formed, and is fitted in a small window or a recess formed at a scanner side and is attached.

7. The image forming apparatus with the plurality of functions according to claim 1, wherein the image information member is bonded to a back surface of a cover member to cover the scanner.

8. An image forming apparatus with a plurality of functions, comprising:
    a scanner to optically read an original document placed on a specified position;
    an image information member provided at a position in a scan area of the scanner and outside an original document placement area, which can be read by the scanner and in which image information for specifying a permitted function or a prohibited function among the plurality of functions is formed; and
    a processing unit configured to read the information for specifying the permitted function or the prohibited function from the image information read by the scanner and to perform a permission or prohibition processing on the function.

9. The image forming apparatus with the plurality of functions according to claim 8, wherein
    the image information formed in the image information member includes the information for specifying the permitted function or the prohibited function and a number intrinsic to the applied image forming apparatus combinedly, and
    the processing unit determines whether the number intrinsic to the image forming apparatus in the image information read by the scanner coincides with a previously set number, and performs a processing, in a case of coincidence, in accordance with the information for specifying the permitted function or the prohibited function.

10. The image forming apparatus with the plurality of functions according to claim 9, wherein in a case where the number intrinsic to the image forming apparatus in the image information read by the scanner does not coincide with the previously set number, the processing unit starts up the image forming apparatus in a previously set default state.

11. The image forming apparatus with the plurality of functions according to claim 8, wherein the image information formed in the image information member is a two-dimensional bar code representing the information in binary data.

12. The image forming apparatus with the plurality of functions according to claim 8, wherein the image information is encrypted, and the processing unit has an encryption decoding function.

13. The image forming apparatus with the plurality of functions according to claim 8, wherein the image information member is attached to a specified position in the scan area and in a replaceable state.

14. The image forming apparatus with the plurality of functions according to claim 8, wherein the image information member is a plate-like member on one side of which the image information is formed, and is fitted in a small window or a recess formed at a scanner side and is attached.

15. An image forming apparatus with a plurality of functions, comprising:
    a network equipment to connect with an external network;
    a scanner to optically read an original document placed on a specified position;

an image information member provided at a position in a scan area of the scanner and outside an original document placement area, which can be read by the scanner and in which an identification number of the applied image forming apparatus on the network is formed as image information; and a processing unit configured to extract the identification number on the network from the image information read by the scanner.

16. The image forming apparatus with the plurality of functions according to claim 15, wherein the image information formed in the image information member includes the identification number on the network and a number intrinsic to the applied image forming apparatus combinedly, and the processing unit determines whether the number intrinsic to the image forming apparatus in the image information read by the scanner coincides with a previously set number, and initializes, in a case of coincidence, the network equipment by using the identification number on the network.

17. The image forming apparatus with the plurality of functions according to claim 16, wherein in a case where the number intrinsic to the image forming apparatus in the image information read by the scanner does not coincide with the previously set number, the processing unit issues a warning and stops start-up of the image forming apparatus.

18. The image forming apparatus with the plurality of functions according to claim 15, wherein the image information formed in the image information member is a two-dimensional bar code representing the information in binary data.

19. The image forming apparatus with the plurality of functions according to claim 15, wherein the image information is encrypted, and the processing unit has an encryption decoding function.

20. The image forming apparatus with the plurality of functions according to claim 15, wherein the image information member is bonded to a back surface of a cover member to cover the scanner.

* * * * *